United States Patent
Sytine et al.

(10) Patent No.: US 9,165,584 B2
(45) Date of Patent: Oct. 20, 2015

(54) AIR BEARING SURFACE HAVING TEMPERATURE/HUMIDITY COMPENSATION FEATURE

(71) Applicant: Seagate Technology LLC, Cupertino, CA (US)

(72) Inventors: Igor Sytine, Plymouth, MN (US); Jeremy Adam Thurn, Bloomington, MN (US); Joseph Michael Stephan, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/937,709

(22) Filed: Jul. 9, 2013

(65) Prior Publication Data

US 2015/0015989 A1 Jan. 15, 2015

(51) Int. Cl.
*G11B 5/60* (2006.01)
*G11B 5/31* (2006.01)
*G11B 5/105* (2006.01)

(52) U.S. Cl.
CPC .............. *G11B 5/6082* (2013.01); *G11B 5/105* (2013.01); *G11B 5/3106* (2013.01); *G11B 5/6005* (2013.01)

(58) Field of Classification Search
USPC .......... 360/235.1, 235.2, 235.3, 235.4, 235.5, 360/236.2, 236.3
See application file for complete search history.

(56) References Cited

U.S. PATENT DOCUMENTS

| | | | | |
|---|---|---|---|---|
| 4,910,621 A * | 3/1990 | Matsuda et al. | ............ | 360/235.1 |
| 5,270,888 A * | 12/1993 | Collisson et al. | .......... | 360/235.1 |
| 5,323,282 A * | 6/1994 | Kanai et al. | ................ | 360/235.3 |
| 5,347,412 A * | 9/1994 | Nitta et al. | ................. | 360/235.3 |
| 5,473,486 A * | 12/1995 | Nepela et al. | ............. | 360/234.7 |
| 5,896,243 A * | 4/1999 | Koshikawa et al. | ....... | 360/234.7 |
| 6,373,659 B1 * | 4/2002 | Hamaguchi et al. | ....... | 360/234.3 |
| 6,385,011 B1 * | 5/2002 | Chang et al. | ............... | 360/234.3 |
| 6,731,463 B2 | 5/2004 | Gates et al. | | |
| 6,760,182 B2 | 7/2004 | Bement et al. | | |
| 6,775,103 B2 * | 8/2004 | Kang et al. | ................. | 360/236.5 |
| 6,836,389 B2 * | 12/2004 | Macken et al. | ........... | 360/235.1 |
| 6,842,308 B1 * | 1/2005 | Pust et al. | .................. | 360/234.7 |
| 7,064,930 B2 * | 6/2006 | Serpe et al. | ................ | 360/236.5 |
| 7,262,937 B2 * | 8/2007 | Pendray et al. | ............ | 360/235.1 |
| 7,345,849 B2 * | 3/2008 | Kawaguchi et al. | ....... | 360/235.3 |
| 7,420,760 B2 | 9/2008 | Zhang et al. | | |
| 7,460,335 B2 * | 12/2008 | Maruyama et al. | ........ | 360/235.2 |
| 7,474,504 B2 * | 1/2009 | Xu et al. | ....................... | 360/128 |
| 7,508,631 B2 * | 3/2009 | Etoh et al. | .................. | 360/235.1 |
| 7,593,189 B2 * | 9/2009 | Thurn | ........................ | 360/234.6 |
| 7,619,857 B2 * | 11/2009 | Kurita et al. | ............... | 360/235.3 |
| 7,646,566 B1 * | 1/2010 | Crimi et al. | ................ | 360/236.5 |
| 7,688,553 B1 * | 3/2010 | Williams et al. | ........... | 360/245.3 |
| 7,746,597 B2 * | 6/2010 | Huang et al. | .................. | 360/122 |

(Continued)

*Primary Examiner* — Brian Miller
(74) *Attorney, Agent, or Firm* — Westman, Champlin & Koehler, P.A.

(57) ABSTRACT

A slider for a head to read data from or write data to a magnetic media is disclosed. The slider includes an air bearing surface including raised bearing surface(s) elevated above recessed bearing surface(s) to pressurize air flow along the air bearing surface to provide a fly height for the slider above the media. The raised bearing surfaces are formed along one or more raised substrate structures etched from a substrate body. The slider includes one or more insets inset into the one or more raised substrate structures formed of an inset material having a different coefficient of expansion than a substrate material of the slider to compensate for temperature and/or humidity changes.

15 Claims, 13 Drawing Sheets

(56) References Cited

U.S. PATENT DOCUMENTS

| | | |
|---|---|---|
| 7,948,713 B2 * | 5/2011 | Ohta et al. ............... 360/235.2 |
| 7,957,104 B2 * | 6/2011 | Fu et al. ................... 360/294.7 |
| 8,159,783 B2 * | 4/2012 | Hirooka et al. ......... 360/125.38 |
| 8,749,920 B1 * | 6/2014 | Knutson et al. ......... 360/125.31 |
| 2004/0150916 A1 * | 8/2004 | Rao et al. ................. 360/235.8 |
| 2008/0043372 A1 * | 2/2008 | Shimozato ................. 360/235.1 |
| 2008/0198510 A1 * | 8/2008 | Sugimoto et al. ......... 360/236.5 |
| 2009/0268335 A1 * | 10/2009 | Huang et al. .................. 360/75 |

* cited by examiner

Fig. 8B

AIR BEARING SURFACE HAVING TEMPERATURE/HUMIDITY COMPENSATION FEATURE

BACKGROUND

Data storage systems position a head above a storage media to read data from and write data to the storage media. The head includes one or more transducer elements on an air bearing slider. The air bearing slider includes an air bearing surface having one or more raised bearing surface elevated above a recessed or cavity surface. Air flow along the air bearing surface creates a pressure profile to provide a fly height for the slider above the storage media. Changes in humidity and temperature can change air flow and the pressure profile along the air bearing surface reducing the fly height of the slider. The reduced fly height of the slider reduces the spacing of the head and the one or more transducer elements from the media which can lead to head-media contact and degrade read and/or write operations. The discussion above is merely provided for general background information and is not intended to be used as an aid in determining the scope of the claimed subject matter.

SUMMARY

The present application relates to an air bearing surface for a head of a data storage device including one or more insets to compensate for changes in the operating conditions of the device. In illustrated embodiments disclosed, the one or more insets are formed in a raised surface and in other embodiments disclosed, the one or more insets are formed in a stepped bearing surface recessed below the raised bearing surface. The raised and/or stepped bearing surfaces of the slider are formed along a raised substrate structure etched from a substrate body. The one or more insets are disposed or inset within a perimeter of the raised substrate structure and are formed of an inset material having a different coefficient of expansion than the substrate material to compensate for temperature and/or humidity changes.

In illustrated embodiments, edges of the one or more insets are spaced inwardly from perimeter edges of the raised substrate structure. The space between the inset edges and the perimeter edges of the substrate forms portions of a raised or stepped substrate surface adjacent to a raised or stepped surface of the inset. The substrate surface portions and inset surface cooperatively form the raised or stepped bearing surfaces of the slider. The difference in the coefficient of expansion between the substrate material and the inset material causes the inset surface to extend above the raised or stepped substrate surface in response to changes in temperature and humidity. Extension of the inset surface above the substrate surface compensates for an increase or decrease in spacing between the transducer elements and the media to maintain desired head-media spacing despite an increase or decrease in temperature and/or humidity.

The one or more insets as described are formed in the high pressure regions of the air bearing surface. In illustrated embodiments, the slider include insets in the raised substrate structure proximate to a mid-point or portion of the slider and other illustrated embodiments, the insets are formed in raised substrate structure or center pad proximate to a trailing edge of the slider to compensate for changes in operating conditions such as temperature and humidity.

Other features and benefits that characterize embodiments of the present application will be apparent upon reading the following detailed description and review of the associated drawings. The above Summary is provided to introduce a selection of concepts in a simplified form and are further described below in the Detailed Description. The Summary is not intended to identify key or essential features of the claimed subject matter, nor is it intended to be used as an aid in determining the scope of the claimed subject matter. The claimed subject matter in not limited to implementations that solve any or all issues noted in the Background.

DETAILED DESCRIPTION OF ILLUSTRATIVE EMBODIMENTS

Figure 1:
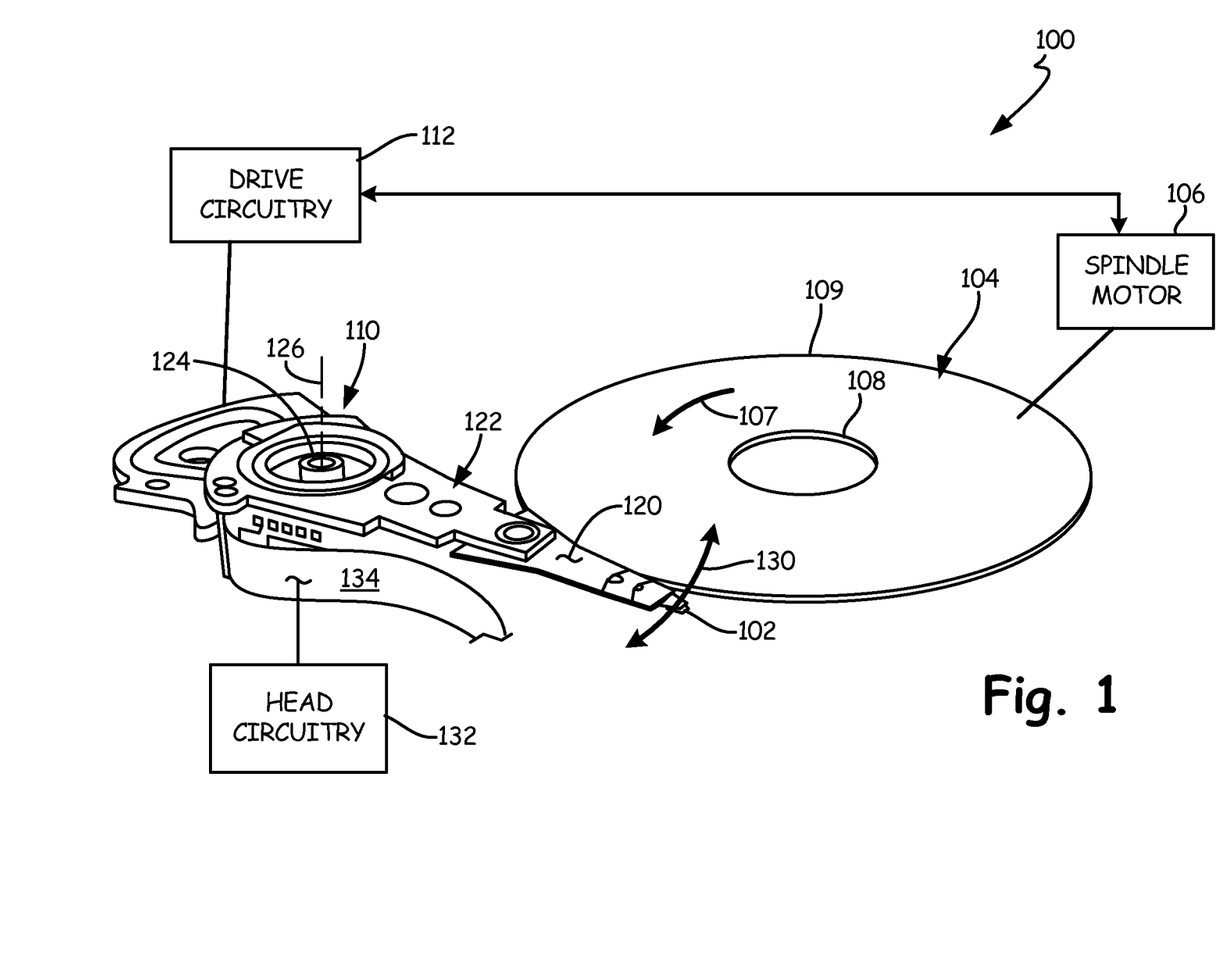
FIG. 1 is a schematic illustration of a data storage system including a data storage media and a head for reading data from and/or writing data to the data storage media.

The present application relates to an air bearing surface for a head for reading data from and/or writing data to a data storage device 100 of the type illustrated in FIG. 1. The head 102 of the data storage device 100 illustrated in FIG. 1 is positioned above a storage media 104 to read data from and/or write data to the data storage media 104. In the embodiment shown, the data storage media 104 is a rotating disc or other magnetic storage media that includes a magnetic storage layer or layers. For read and write operations, a spindle motor 106 (illustrated schematically) rotates the media 104 as illustrated by arrow 107 and an actuator mechanism 110 positions the head 102 relative to data tracks on the rotating media 104. Both the spindle motor 106 and actuator mechanism 110 are connected to and operated through drive circuitry 112 (schematically shown) The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

Figure 2:
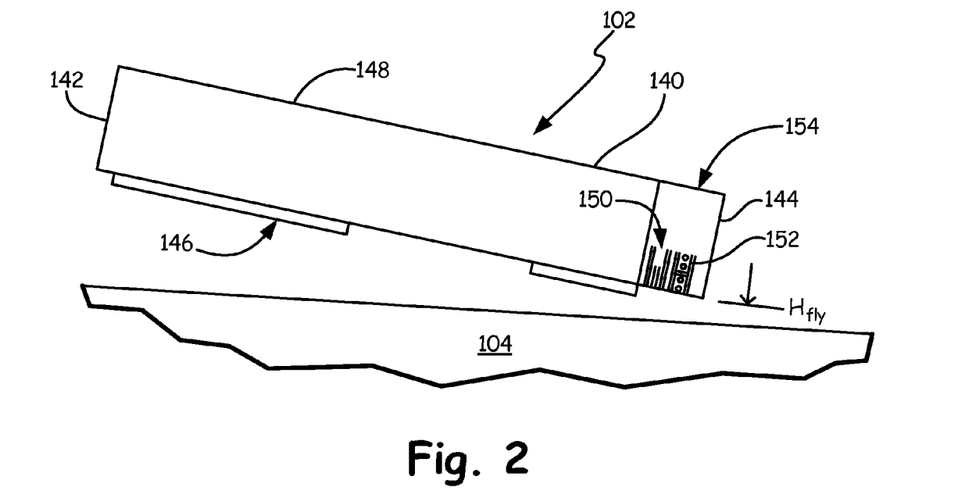
FIG. 2 illustrates a head media interface for a slider having an air bearing surface and one or more transducer elements for reading data from and/or writing data to a data storage media.

The head 102 includes one or more transducer elements (not shown in FIG. 1) coupled to head circuitry 132 through flex circuit 134. As shown in FIG. 2, the head 102 includes a slider 140 having a leading edge 142 and a trailing edge 144. The one or more transducer elements are fabricated along the trailing edge 144 of the slider 140 spaced from the leading edge 142 of the slider 140. An air bearing surface 146 of the slider 140 faces the media 104 and a back surface 148 of the slider 140 faces away from the media 104. In the illustrated embodiment the one or more transducer elements include a read element 150 and a write element 152 (illustrated schematically) encapsulated in $Al_2O_3$ alumina or multiple layer transducer portion 154 on the trailing edge of the slider 140. The read and write elements 150, 152 are electrically coupled to the head circuitry 132 via the flex circuit 134 as shown in FIG. 1 to encode data on and decode data from the media 104. Illustrative read and write elements include magnetoresistive read elements and inductive write elements. Data is encoded on the media using parallel or perpendicular recording techniques. The media 104 can be a bit patterned media or other magnetic storage media including one or more magnetic recording layers.

During operation, rotation of the media or disc 104 creates an air flow along the air bearing surface 146 of the slider 140 from the leading edge 142 to the trailing edge 144 of the slider 140. Air flow along the air bearing surface 146 creates a pressure profile to support the head 102 and slider 140 above the media 104. Separation between a close point of the head and media 104 defines a fly height $H_{fly}$ of the slider 140 above the media 104. In illustrated embodiments, the head 102 includes a heater element (not shown) to protrude a localized portion of the head (e.g. one or more transducer elements) to adjust spacing between the one or more transducer elements on the head 102 and the media 104 to enhance read and/or write operations. The spacing between transducer elements and the media is dependent upon the pressurization of the air bearing surface or fly height $H_{fly}$ of the slider and protrusion of the read and write elements 150, 152 relative to the air bearing surface 146 of the slider 140.

Variations in the operating condition can affect pressurization of the air bearing surface 146 of the slider and alter the fly height $H_{fly}$ of the slider 140 above the media 104. In particular, pressurization along the air bearing surface decreases with increased temperature or humidity. The decrease in pressure along the air bearing surface reduces the fly height $H_{fly}$ of the slider which affects head-media spacing between the transducer elements 150, 152 and the media 104. This application discloses embodiments of an air bearing structure including compensation features to compensate for variations in operating conditions to minimize variations in the head media spacing between the transducer elements 150, 152 and the media 104 due to changes in the operating conditions of the device.

Figure 3A:
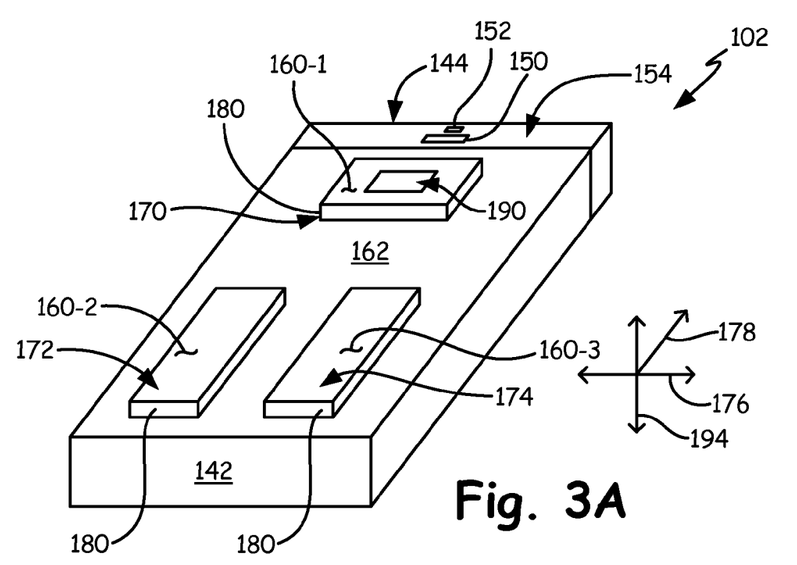
FIGS. 3A-3B illustrate embodiments of an air bearing surface including one or more insets in a raised bearing structure of the air bearing surface to compensate for humidity/temperature variations.
Figure 3B:
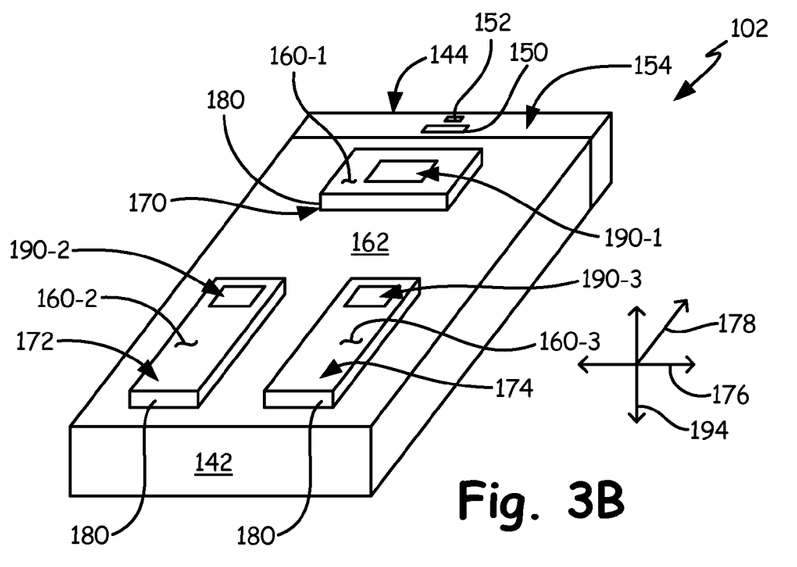

FIG. 3A-3B illustrate embodiments of a head 102 as viewed from the air bearing surface 146 of the slider 140. As shown, the air bearing surface includes raised bearing structures forming raised bearing surfaces 160-1, 160-2, 160-3 elevated above a recessed or cavity or surface 162. The raised bearing structures shown in FIGS. 3A-3B include a center pad 170 and spaced rails 172, 174 elevated above the recessed or cavity surface 162. The center pad 170 is located in front of or downtrack from the rails 172, 174 and has a width in a cross-track direction 176 that forms the raised bearing surface 160-1 proximate to the trailing edge 144 of the slider. The rails 172, 174 are located on opposed sides of the slider and extend along a downtrack direction 178 between the leading and trailing edges of the head 102 or slider 140. The rails 172, 174 form the raised bearing surfaces 160-2, 160-3, which extend along a mid-portion of the slider.

The elevation difference between the raised bearing surfaces 160-1, 160-2, 160-3 and the recessed bearing surface 162 pressurizes the air flow along the air bearing surface to provide the fly height $H_{fly}$ of the head 102 above the media 104. As previously mentioned, air flow dynamics change with changes in temperature and humidity. Changes in air flow dynamics affect the pressure profile provided by the air bearing surface and thus alters or varies the fly height $H_{fly}$ of the slider 140 or head 102. Reductions or alternations in the fly height $H_{fly}$ reduce the head-media spacing between the transducer elements 150, 152 and the media 104.

The raised center pad 170 and rails 172, 174 are formed of raised substrate structures 180 etched from a substrate body to form raised bearing surfaces 160-1, 160-2, 160-3 elevated from the recessed or cavity surface 162. Typically the slider 140 or substrate body is formed of a ceramic substrate material such as aluminum oxide-titanium carbide, $Al_2O_3$ (alumina)-TiC. In the slider embodiments illustrated in FIGS. 3A-3B the raised substrate structures 180 forming the center pad 170 and rails 172, 174 include insets formed of an inset material having a coefficient of expansion and/or contraction that differs from the substrate material of the slider 140. Illustrative inset materials include silicon oxide to provide a higher coefficient of moisture expansion to compensate for humidity variations or titanium oxide having a higher coefficient of thermal expansion to compensate for temperature variations. Illustrative inset materials also include polymer materials, such as polyimide or other hygroscopic material that provides a higher coefficient of moisture expansion than the substrate material.

In the embodiment shown in FIG. 3A, inset 190 is inset in the raised substrate structure 180 forming the center pad 170 and in FIG. 3B insets 190-1, 190-2, 190-3 are inset into the raised substrate structures 180 forming the center pad 170 and rails 172, 174. Inset 190 in FIG. 3A and inset 190-1 in FIG. 3B are located proximate to the trailing edge of the head 102. Insets 190-2, 190-3 in the embodiment illustrated in FIG. 3B are located along rails 172, 174 proximate to the mid-portion of the slider 140. As discussed, increases in temperature and humidity decrease the magnitude of pressure in the high pressure regions of the air bearing surface reducing the fly height $H_{fly}$ of the slider above the media 104. The inset 190 shown in FIG. 3A and insets 190-1, 190-2, 190-3 shown in FIG. 3B are located in high pressure regions of the air bearing surface to compensate for temperature and humidity variations.

Figure 4A:
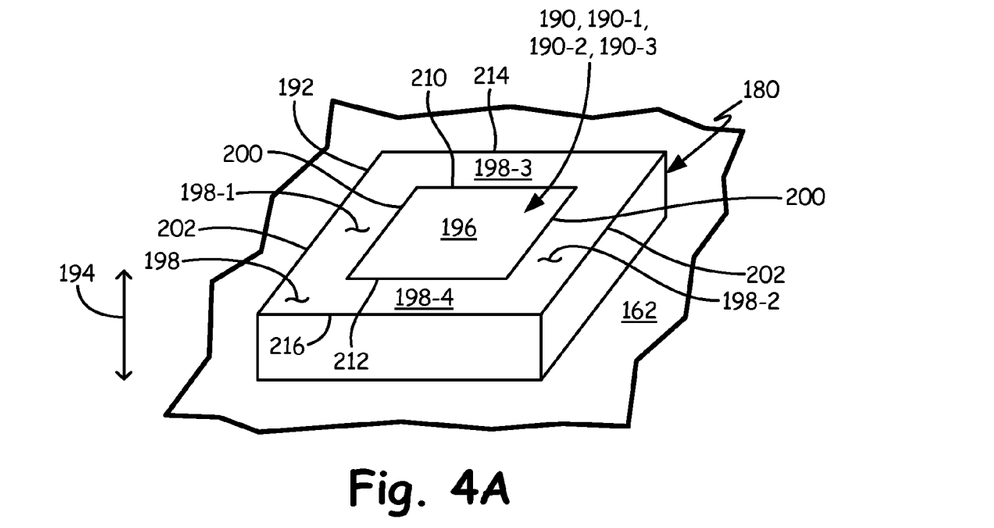
FIGS. 4A-4C illustrate an embodiment of an inset in a raised substrate structure or surface of an air bearing slider to compensate for humidity and/or temperature variations.

FIG. 4A illustrates an embodiment of the raised substrate structure 180 having insets 190, 190-1, 190-2, or 190-3 inset into the raised substrate structure as illustrated in FIGS. 3A-3B. As shown in FIG. 4A, the raised substrate structure 180 includes a perimeter 192 separating the raised substrate structure from the recessed or cavity surface 162. As shown the inset 190, 190-1, 190-2 or 190-3 is located within the raised substrate structure perimeter 192 to restrict expansion of the inset 190, 190-1, 190-2 or 190-3 to a vertical direction 194 toward the media 104 to adjust an elevation of an upper surface 196 of the inset 190, 190-1, 190-2, or 190-3 above a raised substrate surface 198 as comparatively illustrated in FIGS. 4A-4B.

In the illustrated embodiment side edges 200 of the inset 190, 190-1, 190-2 or 190-3, are spaced inward of the side edges 202 of the raised substrate substructure 180 to form raised substrate surface portions 198-1, 198-2 along the side edges 200 of the inset 190, 190-1, 190-2, or 190-3. Also as shown, front and rear edges 210, 212 of the inset are spaced inward from the front and rear substrate edges 214, 216 to form front and rear raised substrate surface portions 198-3, 198-4 along sides 210, 212 of the insets 190, 190-1, 190-2, or 190-3 to enclose the inset 190, 190-1, 190-2 or 190-3 within the raised substrate structure 180. As understood, the raised substrate structure 180 represents the structure forming the center pad 170 or rails 172, 174 or other similar structures etched from the substrate to form the raised bearing surface(s) elevated above recessed or cavity surfaces 162.

Figure 4B:
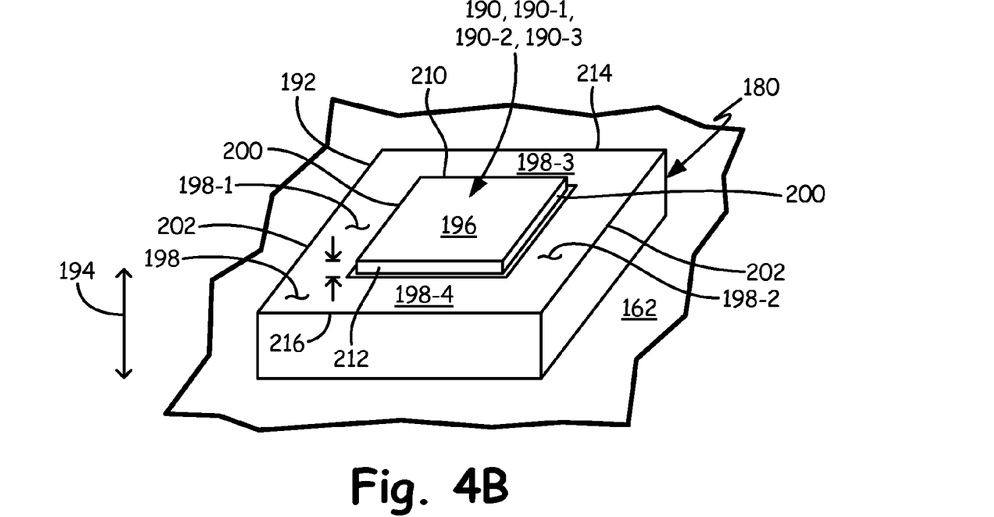

As shown in FIG. 4B, expansion of the inset 190, 190-1, 190-2, 190-3 in response to changes or increase in temperature and/or humidity elevates the inset surface 196 above the substrate surface 198 since the inset material has a higher coefficient of expansion than the substrate material. In the illustrated embodiment shown in FIG. 4B, perimeter surface portions 198-1, 198-2, 198-3, 198-4 of the substrate along the sides 200 and front and rear edges 210, 212 of the inset 190, 190-1, 190-2 or 190-3 restrict expansion of the inset 190, 190-1, 190-2 or 190-3 so that the inset expands vertically 194 above the substrate surface 198 toward the media 104 as previously described. Expansion of the inset material increases the spacing between the high pressure region of the air bearing surface and the transducer elements 150, 152 on the head to compensate for fly height $H_{fly}$ changes due to temperature and/or humidity variations to maintain a desired head-media spacing between the transducer elements 150, 152 and the media.

Figure 4C:
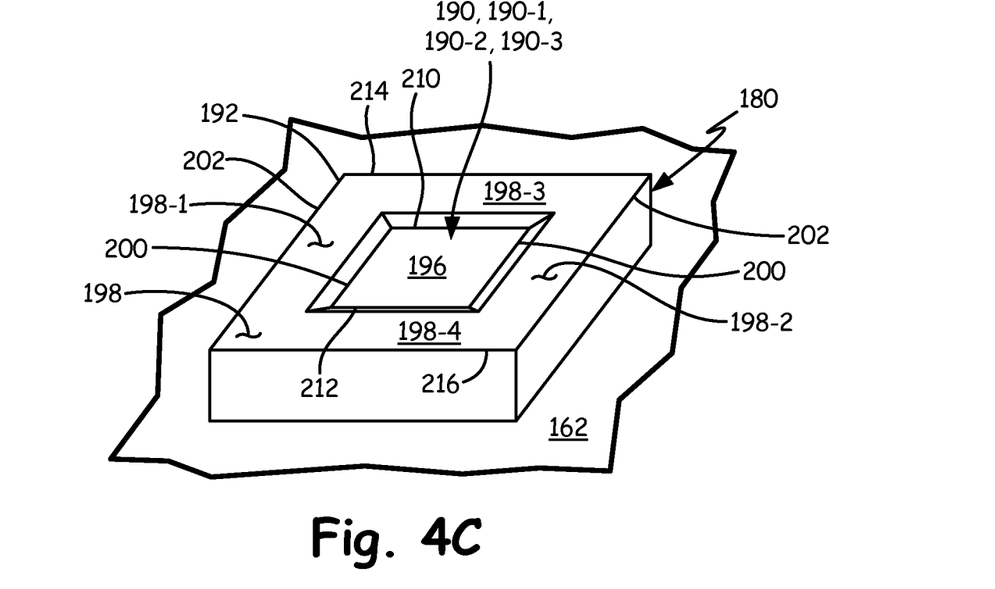

In another embodiment, as illustrated in FIG. 4C, the material of the inset 190, 190-1, 190-2, or 190-3 contracts so that the inset surface 196 is recessed below the substrate surface 198 to reduce the spacing between the high pressure region and the transducer elements 150, 152 to compensate for changes in temperature or humidity. Although the raised substrate structure 180 shown includes one inset other substrate structures can have more than one or multiple insets as illustrated in additional embodiments disclosed herein.

FIGS. 5A-5D illustrate alternate embodiments of the inset 190, 190-1, 190-2, or 190-3 in the raised substrate structure 180. In each of the illustrated embodiments, the inset is located within perimeter 192 of the raised substrate structure 180 to provide an adjustable bearing surface within high pressure regions of the air bearing surface 146. In the embodiment shown in FIG. 5A, the inset is located along the rear edge 216 of the raised substrate structure 180. As shown, inset side edges 200 are spaced inwardly from the side edges 202 of the substrate structure 180 and a front edge 210 of the inset is spaced inwardly form a front edge 214 of the raised substrate structure 180 to form substrate surface portions 198-1, 198-2, 198-3 along the sides 200 and front edge 210 of the inset 190, 190-1, 190-2 or 190-3.

Figure 5A:
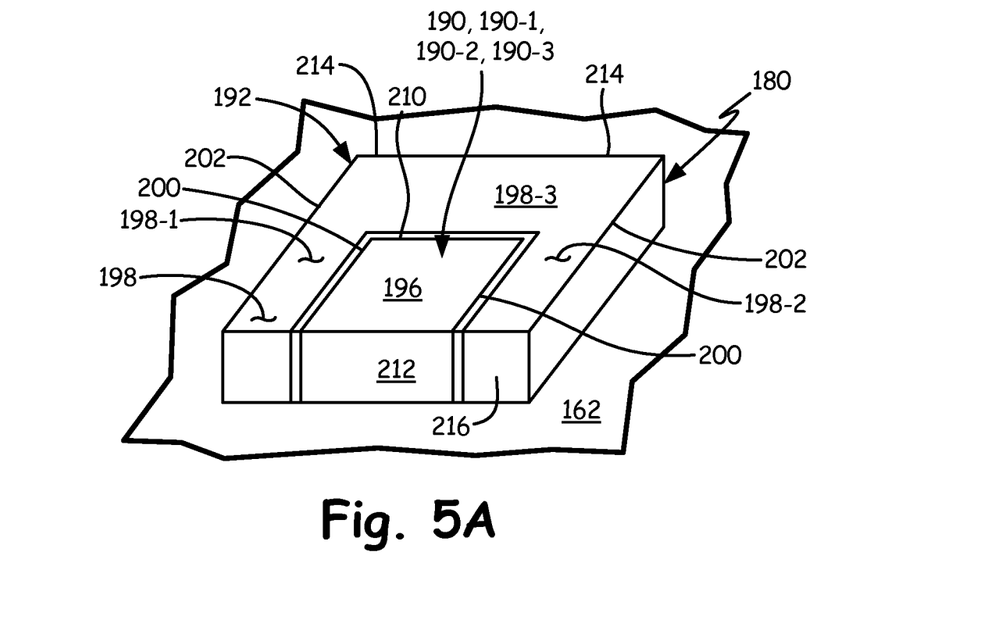
FIGS. 5A-5D illustrate embodiments of an inset in a raised substrate structure or surface of an air bearing slider.
Figure 5B:
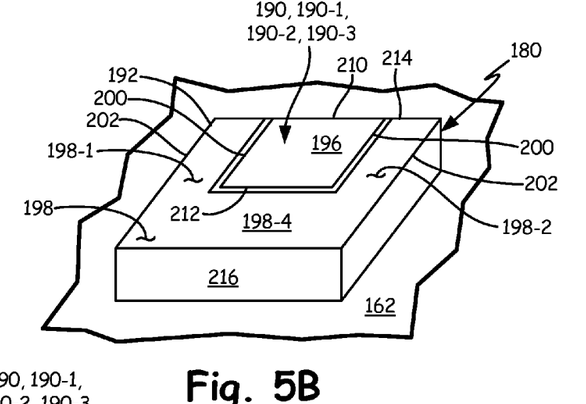
Figure 5C:
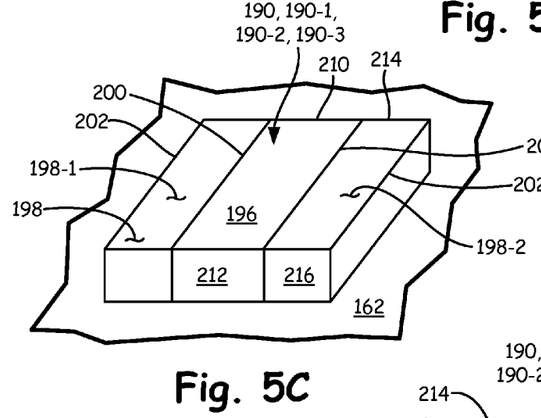
Figure 5D:
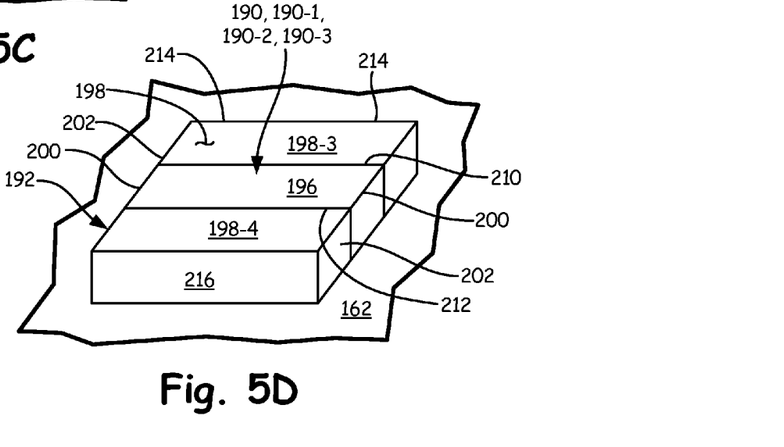

In embodiment illustrated in FIG. 5B, the inset 190, 190-1, 190-2, 190-3 is located along a front edge 214 of the raised substrate structure 180. As shown in FIG. 5B, the side edges 200 of the inset are spaced inwardly from the side edges 202 of the raised substrate structure 180 and the rear inset edge 212 is spaced forward or downstream of the rear substrate edge 216 to form substrate surface portions 198-1, 198-2 and 198-4 along the sides 200 and rear edge 212 of the inset. In the embodiment illustrated in FIG. 5C, the inset side edges 200 are spaced inward of the substrate side edges 202 to form raised substrate surfaces or portions 198-1, 198-2 along the sides 200 of the inset while the length of the inset 190, 190-1, 190-2, or 190-3 extends along the length of the raised substrate structure 180. In the embodiment shown in FIG. 5D, the front and rear edges 210, 212 of the inset are spaced from the front and rear edges 214, 216 of the raised substrate structure 180 to form substrate surface portions 198-3, 198-4 along the front and rear edges 210, 212 of the inset 190, 190-1, 190-2, or 190-3 while the width of the inset extends along the width of the raised substrate structure 180.

FIGS. 5A-5D illustrate embodiments of different locations of the inset within the perimeter 192 of the raised substrate structures 180 to illustrate that placement of the inset 190, 190-1, 190-2 or 190-3 is not limited to the inset location illustrated in FIGS. 4A-4C. Also, it should be noted that the raised substrate structure is not limited to the square shaped structures as shown and the raised substrate structures 180 and insets can have different shapes and configuration as illustrated by the additional air bearing surfaces disclosed herein.

Figure 6A:
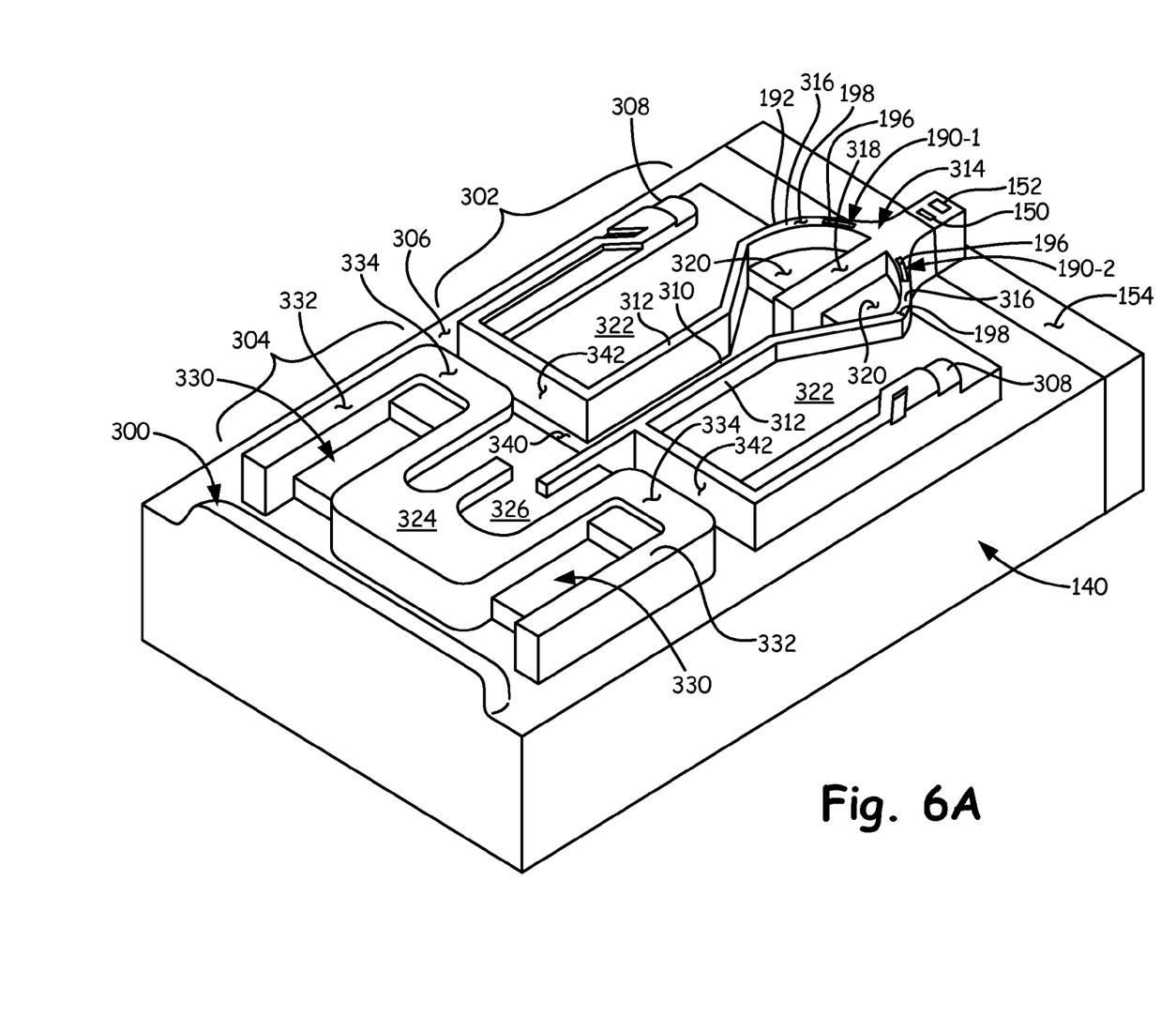
FIGS. 6A-6B illustrates embodiments of a slider including insets in a raised substrate structure or surface of the air bearing slider.
Figure 6B:
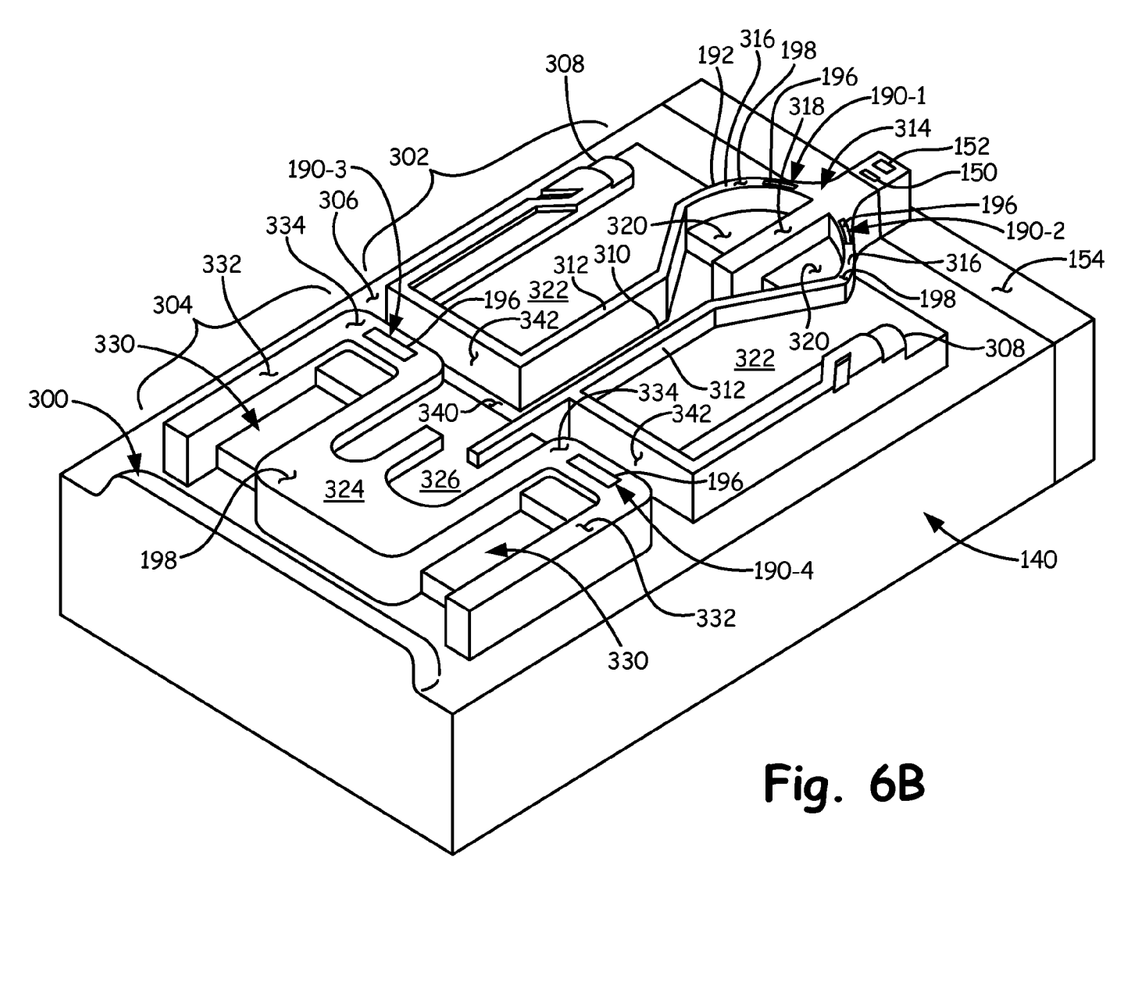

FIGS. 6A-6B illustrates additional embodiments of an air bearing surface 146 including one or more insets 190, 190-1, 190-2, 190-3 or 190-4 to compensate for variations in the operating temperature or humidity as previously described. In the embodiment illustrated in FIG. 6A, the air bearing surface includes a leading edge air dam 300, front bearing structure 302 and rear bearing structure 304 elevated from or above a cavity surface 306. As shown in FIG. 6A, front bearing structure 302 includes a front center portion and side rails 308. As shown, the front center portion includes cavity channel 310 formed between spaced center rails 312 and a center pad portion 314 at trailing end of cavity channel 310.

The center pad portion 314 is formed of a raised substrate structure having raised side arms 316 and median 318 and steps 320 between the side arms 316 and the median 318. The side arms 316 and median 318 form a generally "U" shaped raised bearing surface and the steps 320 form stepped bearing surfaces to pressurize the raised bearing surface. Fluid flow is directed through cavity channel 310 to the stepped and raised bearing surfaces of the center pad portion 314 at the trailing edge of the slider. As shown, front side rails 308 are spaced from the center pad portion 314 and include raised and stepped bearing surfaces. A base surface 322 recessed below the raised and stepped bearing surfaces and elevated above the cavity surface 306 separates the front center portion or rails 312 from side rails 308 as shown.

The rear bearing structure 304 includes a rear center portion and side portions. The rear center portion includes a raised substrate structure forming a raised center portion 324 and base surface portion 326 in front of the raised center portion 324. Side portions include flow channels 330 formed between side rails 332 and the raised center portion 324 to pressurize rear pads 334 at the trailing edge of the channel 330. As shown, the side portions include recessed and stepped bearing surfaces along channels 330 to pressurize flow upstream of the rear pads 334. A cavity channel 340 separates the front bearing structure 302 from the rear bearing structure 304. Traverse rails 342 of the front bearing structure 302 direct fluid flow or air to cavity channel 310 to provide fluid flow to the raised and stepped bearing surfaces of the center pad portion 314. In an illustrated embodiment, stepped bearing surfaces are recessed from raised surfaces approximately 0.25 microns and the base surfaces 322, 326 are recessed 1.0 micron from the raised bearing surface and the recessed or cavity surface(s) 306, 340 are recessed 4-5 microns from the raised bearing surface(s). It should be understood that application is not limited to the specific dimensions provided and different offset dimensions can be used depending upon the particular application.

In the embodiment shown in FIG. 6A, the center pad portion 314, side rails 308, raised center portion 324 and pads 334 are formed from raised substrate structures etched from a substrate body as previously described. As shown in FIG. 6A, insets 190-1, 190-2 are disposed in the raised substrate structure forming the center pad portion 314 proximate to the trailing edge of the slider. As shown, insets 190-1, 190-2 as previously described are formed within the perimeter 192 of raised substrate structure forming arms 316 on opposed sides of median 318 proximate to high pressure region of the trailing edge of the slider. Insets 190-1, 190-2 are spaced on opposed sides of the roll axis to balance the pressure profile to limit movement of the slider about the roll axis. Thus, as described, inset surfaces 196 of insets 190-1, 190-2 and substrate surface 198 of the arms 316 cooperatively form the raised bearing surface at the trailing edge of the slider.

In another embodiment, as shown in FIG. 6B, where like numbers are used to refer to like parts in FIG. 6A, both the front and rear raised substrate structures forming the arms 316 and pads 334 include insets 190-1, 190-2, 190-3, 190-4. The insets 190-1, 190-2, 190-3, 190-4 as shown are in the high pressure regions as previously described. As shown, insets 190-1, 190-2 are formed in the center pad portion 314 proximate to the trailing edge of the slider and insets 190-3, 190-4 are formed in the rear pads 334 proximate to the mid-point of the slider 140. As previously described, insets 190-1, 190-2 are formed within front and rear perimeter edges of the arm 316 which form a portion of the raised substrate structure along a front portion of the slider 140. The inset surface 196 and raised substrate surface 198 of the arms 316 thus form the raised bearing surface proximate to a trailing edge of the slider 140. Insets 190-3 and 190-4 shown in FIG. 6B are disposed within a perimeter of raised substrate structure forming pads 334 to cooperatively form a portion of the raised bearing surface in cooperation with the substrate surface of the pads 334 proximate to the mid-point of the slider.

In previous embodiments described, insets 190, 190-1, 190-2, or 190-3 are disposed on the raised substrate surface 198 of the raised substrate structure 180. In an alternate embodiment illustrated in FIG. 7A, one or more insets 190, 190-1, 190-2, 190-3 or 190-4 are located in the stepped substrate surface 198A of the raised substrate structure 180 below the raised substrate surface 198. As previously described in an illustrated embodiment, the stepped substrate surface 198A is recessed 0.25 microns below the raised substrate surface 198. As shown in the illustrated embodiment, the inset surface 196 of the inset is recessed below the raised substrate surface 198 to form a portion of the stepped bearing surface below the raised substrate surface 198. Expansion of the one or more insets 190, 190-1, 190-2, 190-3 or 190-4 raises an elevation of inset surface 196 relative to or above the stepped surface 198A changing the elevation of the stepped surface 198A along the high pressure region responsive to an increase in temperature or humidity to maintain desired head-media spacing between the transducer elements 150, 152 and the media despite changes in temperature and humidity. The inset can be positioned in different locations of the stepped substrate surface 198A as illustrated with respect to the previous embodiments of the inset in the raised substrate surface 198 as shown in FIGS. 5A-5D.

Figure 7A:
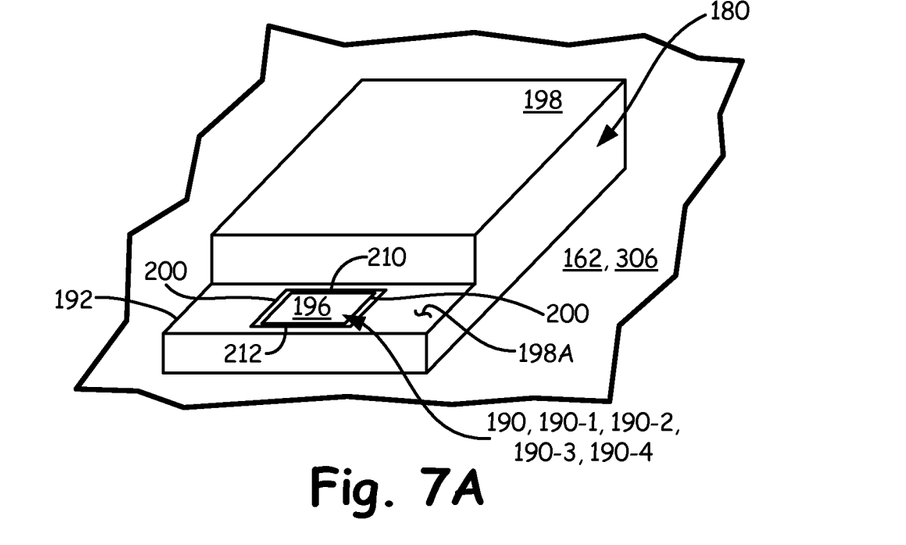
FIGS. 7A-7B illustrate a raised substrate structure including a stepped bearing surface below a raised bearing surface and an inset in the stepped bearing surface of the raised substrate structure.
Figure 7B:
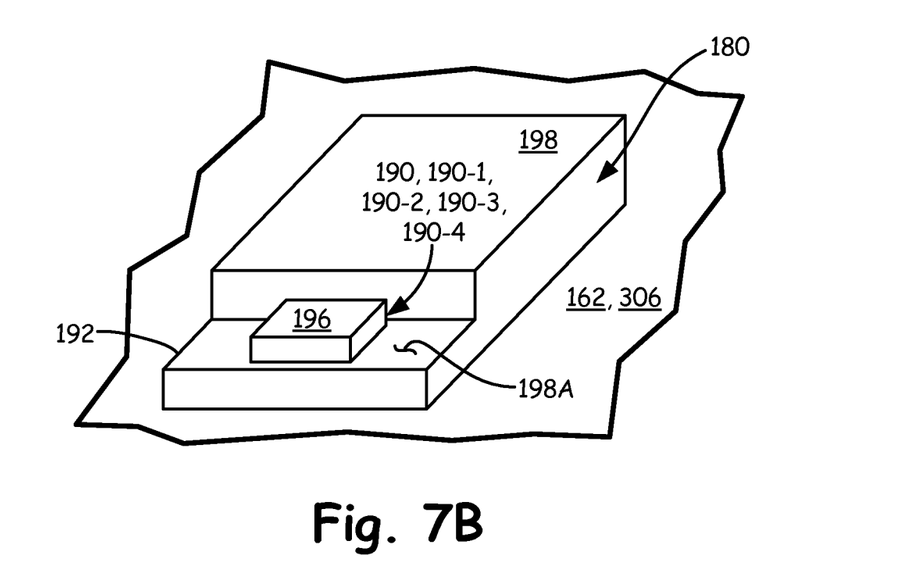
Figure 8A:
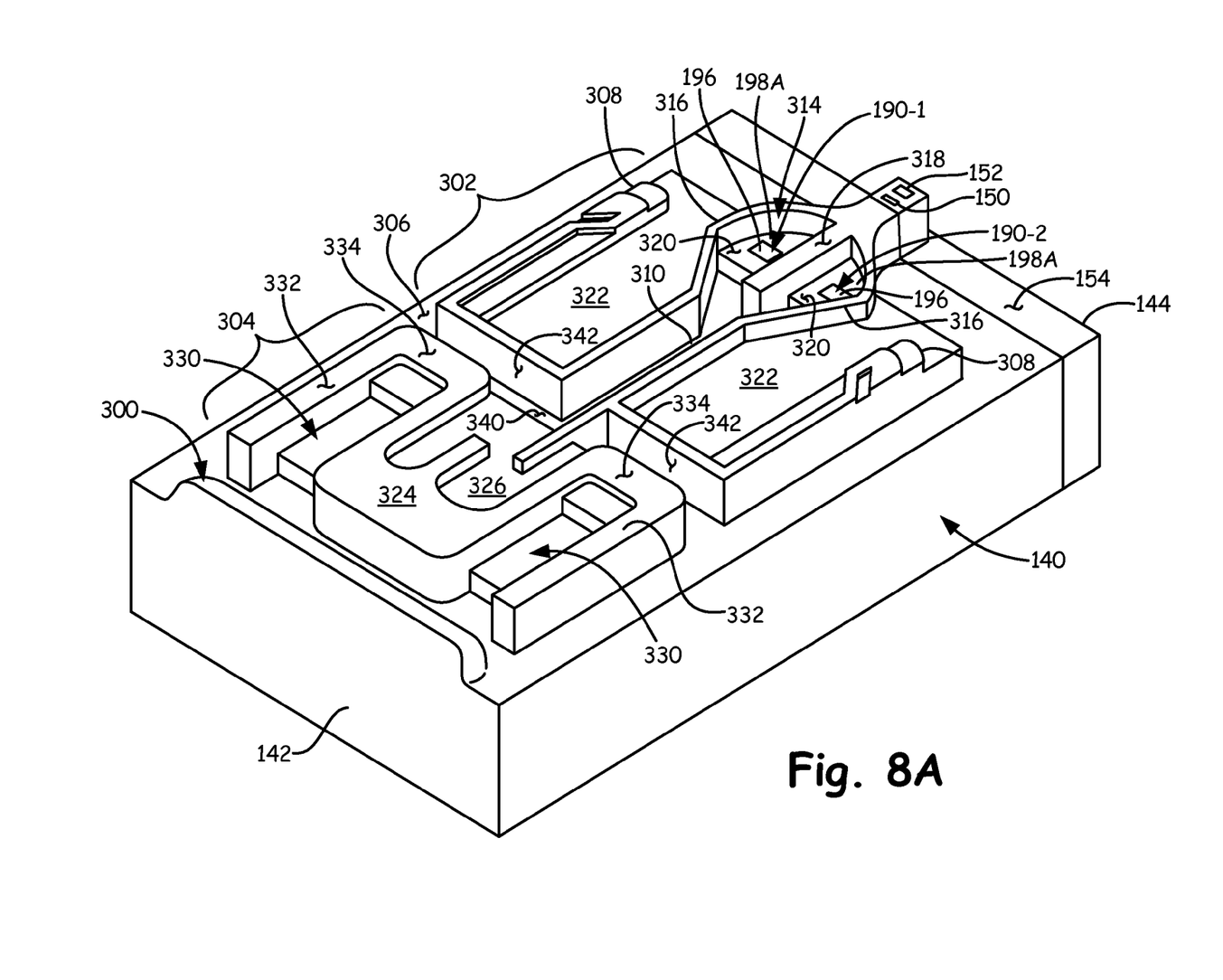
FIGS. 8A-8B illustrate embodiments of a slider including a raised structure including stepped bearing surfaces recessed below raised bearing surfaces and including one or more insets in the stepped bearing surfaces.
Figure 8B:
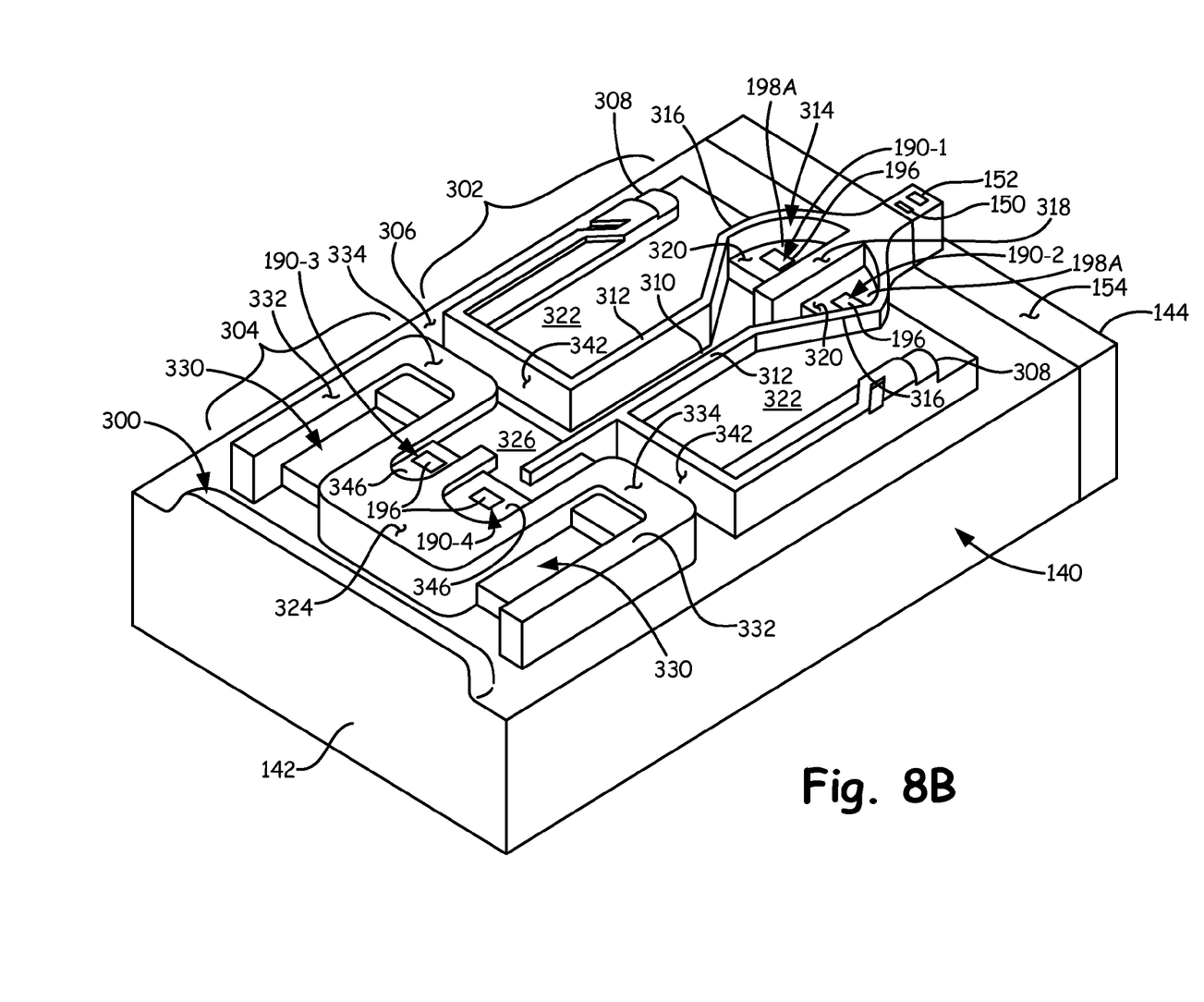

FIG. 8A-8B illustrate embodiments of an air bearing surface of the slider 140 including one or more insets described herein formed in stepped substrate surfaces 198A of the raised substrate structure 180 as illustrated in FIGS. 7A-7B. Expansion of the insets elevates the inset surface 196 above the stepped or substrate surface 198A along the high pressure region of the air bearing surface to compensate for head-media spacing variations response to changes in temperature and/or humidity. In the embodiment shown in FIG. 8A, insets 190-1, 190-2 are formed in the stepped substrate surfaces 198A forming the stepped bearing surfaces of steps 320 proximate to a trailing edge of the slider. In the embodiment illustrated in FIG. 8B, insets 190-1, 190-2 are formed in the stepped substrate surfaces 198A forming the stepped bearing surfaces at steps 320 proximate to the trailing edge of the slider. Insets 190-3, 190-4 are inset in the stepped substrate surfaces 198A forming stepped bearing surfaces 346 downtrack of the raised center portion 324 proximate to the mid-point of the slider to provide a compensation feature proximate to the mid-point of the slider as described.

Figure 9:
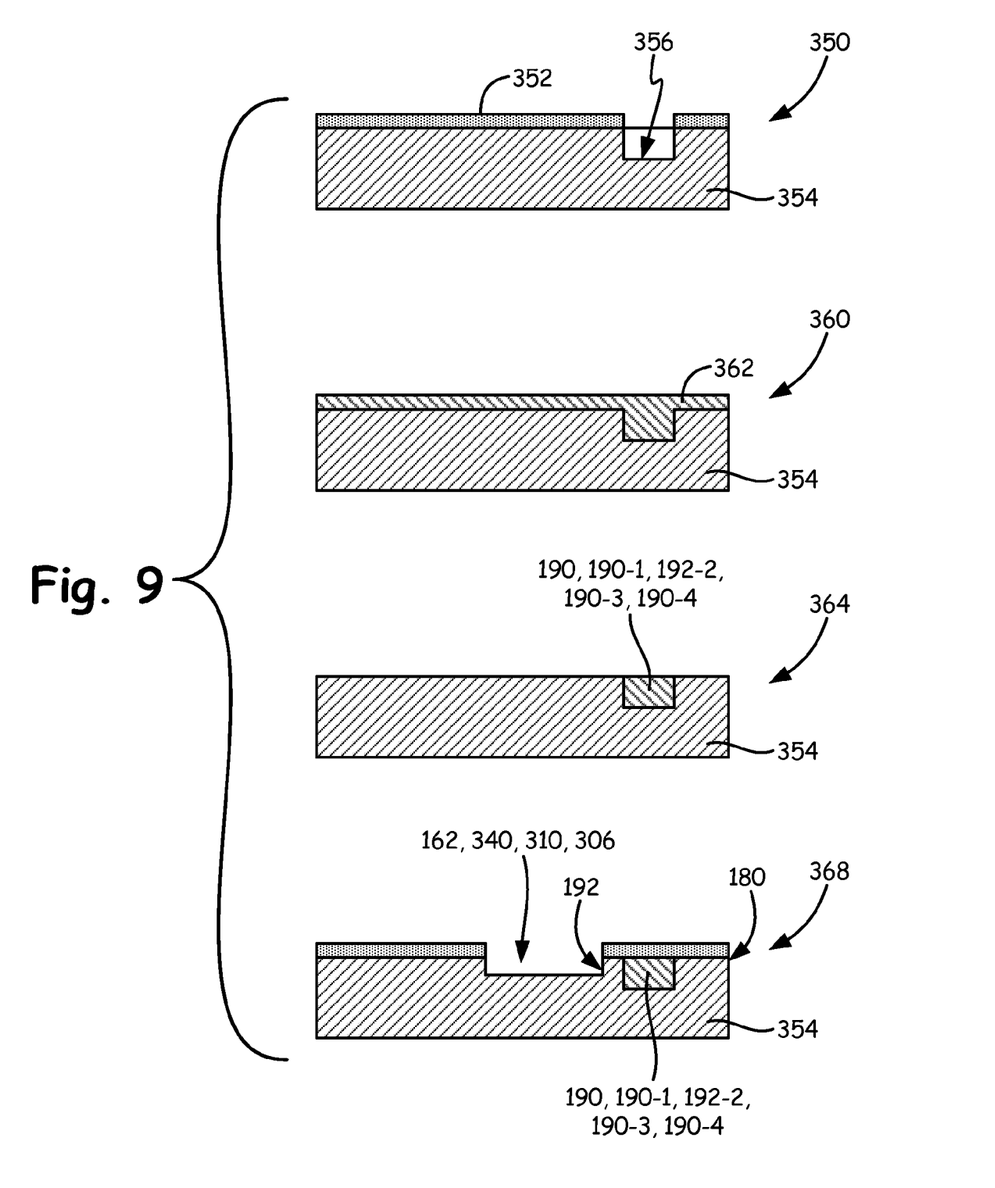
FIG. 9 illustrates process steps for fabricating an inset in a raised substrate structure or surface of an air bearing slider.

FIG. 9 illustrates a process for fabricating the air bearing structure and inset using masking and deposition process steps. As shown in process step 350, a mask 352 is applied to a substrate body 354 to etch an inset cavity 356 in the substrate body 354. In step 360, a layer of material 362 having a higher coefficient of expansion than the substrate body 354 is deposited on the substrate 354 to fill the inset cavity 356. The deposited layer 362 is planarized in step 364 to form the inset 190, 190-1, 190-2, 190-3, or 190-4. One or more masking and etching steps are employed to form the recessed and cavity surfaces 162, 306, 340 and the perimeter 192 separating the recessed or cavity surfaces 160, 306, 310, 340 from the raised substrate surface 198. In particular, as shown in step 368, the substrate 354 is etched to form perimeter edges of the raised substrate structures 180 and the inset within a perimeter of the raised substrate structure 180.

Figure 10:
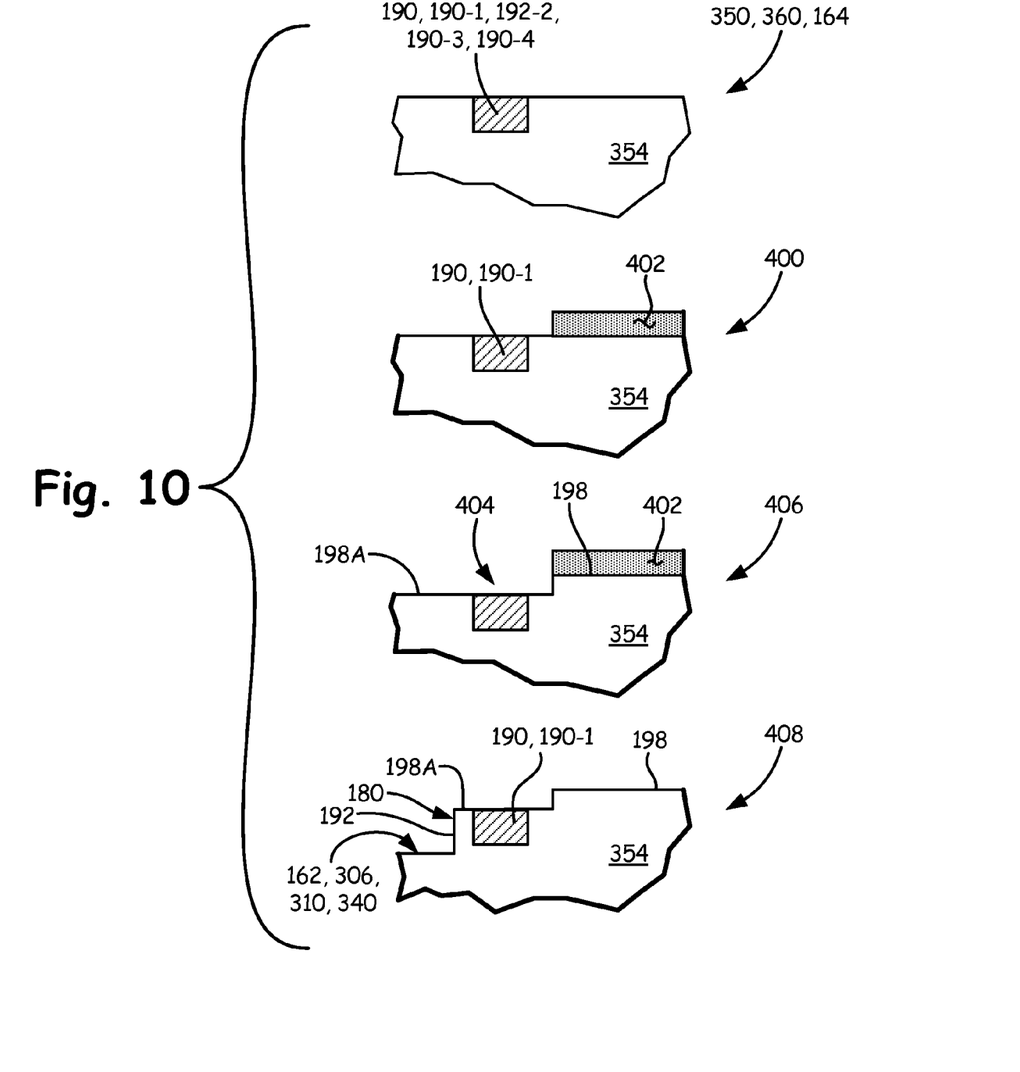
FIG. 10 illustrates process steps for fabricating an inset in a stepped bearing surface of a raised substrate structure of an air bearing slider.

FIG. 10 illustrates process steps for fabricating the inset in the stepped substrate surface 198A as illustrated in FIGS. 7A-7B. As previously described, the inset 190, 190-1, 190-2, 190-3, or 190-4 is formed in the substrate as described in steps 350, 360, 364 shown in FIG. 9. As shown in step 400, a mask 402 is applied to the substrate 354 and unmasked areas 404 of the substrate are etched in step 406 to form the stepped substrate surface 198A and inset within a perimeter of the stepped surface 198A. As illustrated in step 408, the process includes one or more additional etching and masking steps to form the recessed and cavity surfaces 162, 306, 310, 340 below the stepped substrate surface 198A to form the perimeter of the raised substrate structure 180 having an inset formed with the perimeter of the structure 180 as described.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the system while maintaining substantially the same functionality without departing from the scope and spirit of the present invention. Although illustrated slider embodiments disclosed in the application include specific inset structures and arrangements, the inset and bearing structures disclosed in the various embodiments can be combined or substituted for different inset and bearing structures to form different air bearing surface configurations with temperature and/or humidity compensation. In addition, although the preferred embodiment described herein is directed to a particular data storage system, it will be appreciated by those skilled in the art that the teachings of the present invention can be applied to other data storage device, such as optical devices, without departing from the scope and spirit of the present invention.

What is claimed is:

1. A slider comprising:
   a substrate formed of a substrate material including a raised substrate structure having a raised bearing surface elevated above a recessed bearing surface and elevated above one or more transducer elements in the slider, wherein the raised substrate structure is spaced apart from the one or more transducer elements; and
   an inset, positioned in a high pressure region of a raised bearing surface, formed of an inset material having a different coefficient of expansion than the substrate material disposed in an inset cavity formed in the raised substrate structure, wherein the inset comprises an inset surface formed substantially flush with the raised bearing surface at initial formation of the inset under initial conditions comprising an initial temperature level and an initial humidity level, and wherein:
   the inset surface is configured to elevate above the raised bearing surface in response to at least one of an increase in an environmental temperature relative to the initial temperature level or an increase in an environmental humidity relative to the initial humidity level; and
   the inset surface is configured to fall below the raised bearing surface in response to at least one of a decrease in the environmental temperature relative to the initial temperature level or a decrease in the environmental humidity relative to the initial humidity level.

2. The slider of claim 1 wherein the substrate includes a leading edge and a trailing edge and comprising the one or more transducer elements along the trailing edge of the substrate forward of the inset in the raised substrate structure.

3. The slider of claim 1 wherein the inset material has a higher coefficient of thermal expansion than the substrate material.

4. The slider of claim 1 wherein the inset material has higher coefficient of moisture expansion than the substrate material.

5. The slider of claim 1 wherein the inset is located within a perimeter of the raised substrate structure separating the raised bearing surface from the recessed bearing surface.

6. The slider of claim 1 wherein the inset includes inset edges located within a perimeter of the raised substrate structure.

7. The slider of claim 6 wherein the perimeter of the raised substrate structure includes side edges and the inset include inset side edges spaced inwardly from the substrate side edges to form raised substrate surface portions extending along the inset side edges.

8. The slider of claim 7 wherein the perimeter of the raised substrate structure include front and rear substrate edges and the inset includes front and rear inset edges and the front and rear inset edges are spaced inwardly from the front and rear substrate edges to form raised substrate surface portions extending along the front and rear inset edges.

9. The slider of claim 6 wherein the perimeter of the raised substrate structure includes front and rear substrate edges and front and rear inset edges of the inset are spaced inwardly from the front and rear substrate edges to form front and rear raised substrate surface portions extending along the front and rear inset edges.

10. The slider of claim 1 wherein the raised substrate structure includes a raised center pad proximate to a trailing edge of the slider and the inset is formed in the raised center pad.

11. The slider of claim 1 wherein the raised substrate structure forms raised bearing surface proximate to a mid-point of the slider and the inset is formed in the raised bearing surface proximate to the mid-point of the slider.

12. A slider comprising:
   a substrate body formed of a substrate material including a raised substrate structure having a raised bearing surface elevated above a recessed bearing surface and the raised substrate structure including a perimeter separating the raised bearing structure from the recessed bearing surface, wherein the raised bearing surface is elevated above one or more transducer elements in the slider, and wherein the one or more transducer elements are located outside the perimeter; and
   a substrate inset, positioned in a high pressure region of a raised bearing surface, formed of an inset material having a different coefficient of expansion from the substrate material inset into the raised substrate structure within the perimeter of the raised substrate structure, wherein the substrate inset comprises an inset surface formed substantially flush with the raised bearing surface at initial formation of the inset under initial conditions comprising an initial temperature level and an initial humidity level, and wherein:
   the inset surface is configured to elevate above the raised bearing surface in response to at least one of an increase in an environmental temperature relative to the initial temperature level or an increase in an environmental humidity relative to the initial humidity level; and
   the inset surface is configured to fall below the raised bearing surface in response to at least one of a decrease in the environmental temperature relative to the initial temperature level or a decrease in the environmental humidity relative to the initial humidity level.

13. The slider of claim 12 wherein the inset material has a higher coefficient of thermal or moisture expansion than the substrate material.

14. The slider of claim 12 wherein the raised substrate structure includes the raised bearing surface proximate to a mid-point of the slider between a leading edge and a trailing edge of the slider and the inset is inset into the raised bearing surface proximate to the mid-point of the slider.

15. The slider of claim 12 wherein the raised substrate structure includes a raised center pad proximate to a trailing edge of the slider and the inset is inset into the raised center pad.

* * * * *